United States Patent [19]

Beach et al.

[11] Patent Number: 5,494,507
[45] Date of Patent: Feb. 27, 1996

[54] DYE HAVING HYDROPHOBIC SUBSTITUENT AND AQUEOUS INK

[75] Inventors: Bradley L. Beach, Lexington, Ky.; James F. Feeman, Wyomissing, Pa.; Ann M. Piekunka, Lexington; Allen C. Sanders, Winchester, both of Ky.

[73] Assignee: Lexmark International, INc., Greenwich, Conn.

[21] Appl. No.: 359,230

[22] Filed: Dec. 19, 1994

[51] Int. Cl.$^6$ .................. C09D 11/02; C07C 245/08; C07C 245/18
[52] U.S. Cl. .......... 106/22 K; 534/649; 534/781; 534/815; 534/824; 534/872
[58] Field of Search .............. 106/22 K; 534/649, 534/781, 815, 824, 872

[56] References Cited

U.S. PATENT DOCUMENTS

| | | | |
|---|---|---|---|
| 4,626,284 | 12/1986 | Ohta et al. | 106/22 K |
| 4,929,277 | 5/1990 | Tanaka et al. | 106/22 K |
| 5,074,914 | 12/1991 | Shirota et al. | 106/22 K |
| 5,106,416 | 4/1992 | Moffatt et al. | 106/20 |
| 5,127,947 | 7/1992 | Takimoto et al. | 106/22 K |
| 5,135,571 | 8/1992 | Shirota et al. | 106/22 K |
| 5,213,614 | 5/1993 | Eida et al. | 106/22 K |
| 5,275,647 | 1/1994 | Winnik | 106/22 E |
| 5,281,263 | 1/1994 | Gregory et al. | 106/22 K |
| 5,429,671 | 7/1995 | Yamamoto | 106/22 K |

*Primary Examiner*—Helene Klemanski
*Attorney, Agent, or Firm*—John A. Brady

[57] ABSTRACT

A dye having a representative formula as follows and an ink providing waterfast printing having the dye, in which a surfactant is not essential:

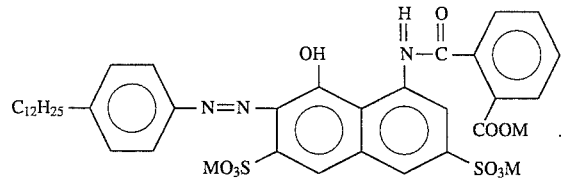

21 Claims, No Drawings

DYE HAVING HYDROPHOBIC SUBSTITUENT AND AQUEOUS INK

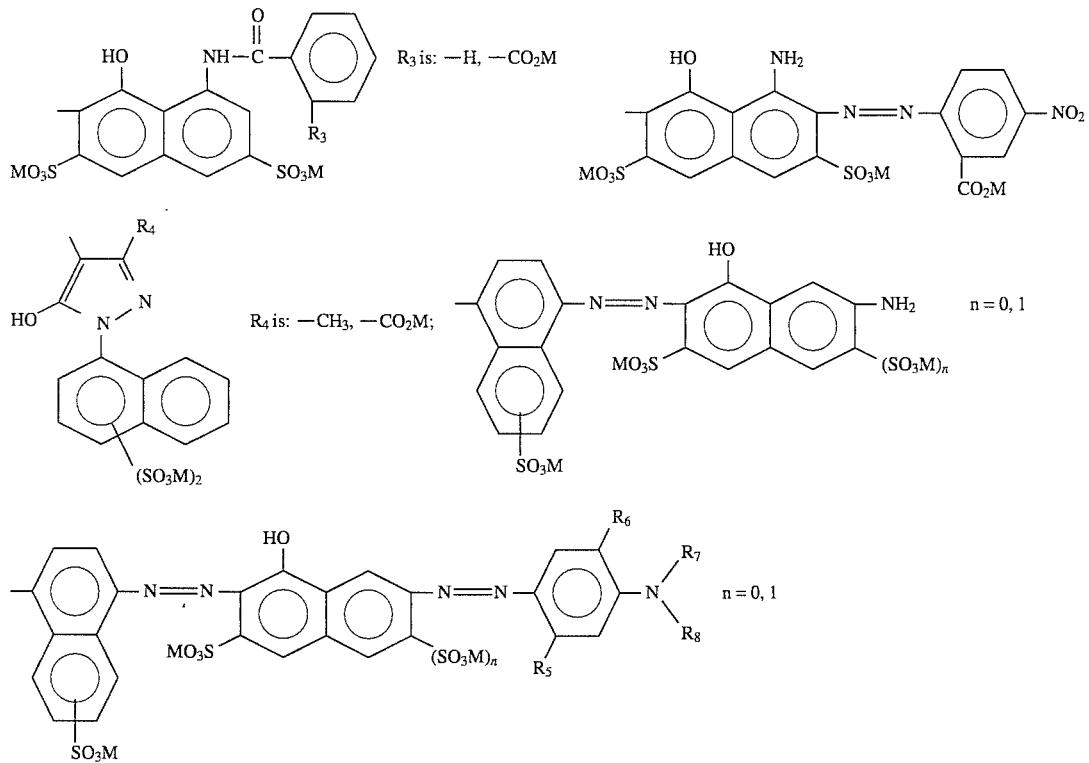

TECHNICAL FIELD

This invention relates to aqueous ink jet inks which are stable during storage and use and waterfast after printing. More specifically, this invention relates to dye molecules which provide the color or hue in final printing, which are waterfast when printed and which are soluble or dispersible in aqueous ink with little or no dispersants added to the ink.

BACKGROUND OF THE INVENTION

U.S. Pat. No. 5,106,416 to Moffatt et al is directed to cationic dyes in aqueous ink jet inks which are dissolved or dispersed using surfactants or amphiphiles to form micellies. U.S. Pat. No. 5,275,647 to Winnik is directed to surfactant micellies colored with dyes covalently attached in aqueous ink jet inks. The dyes of this invention are believed to be dissolved or dispersed through the formation of micellies, but not with the essential aid of any additive. The jet ink is therefore potentially inexpensive in manufacture and cost of ingredients.

DISCLOSURE OF THE INVENTION

This invention is an ink jet ink having a dye molecule of the following formula and the dye molecules themselves.

The dye molecule is the following:

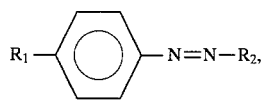

Wherein:

$R_1$ is an alkyl group having from 6 to 16 carbon atoms;

$R_2$ is:

$R_3$ is: —H, —$CO_2M$ $R_4$ is: —$CH_3$, —$CO_2M$;

n = 0, 1 n = 0, 1

$R_5$ is: —H, —lower alkyl, —lower alkoxyl;

$R_6$ is: —H—lower alkyl, —lower alkoxyl;

$R_7$ is: —lower alkyl, —lower hydroxyalkyl, —$CH_2CH_2CO_2M$;

$R_8$ is: —lower hydroxyalkyl, —$CH_2CH_2CO_2M$.

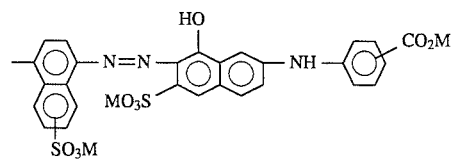

M is —H, —$NH_4$, —Li, —Na, —K.

The foregoing dye is magenta when $R_1$ is $C_{12}H_{25}$ and $R_2$ is

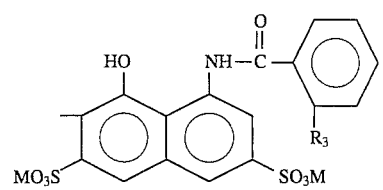

The foregoing dye is black when $R_1$ is $C_{12}H_{25}$ and $R_2$ is
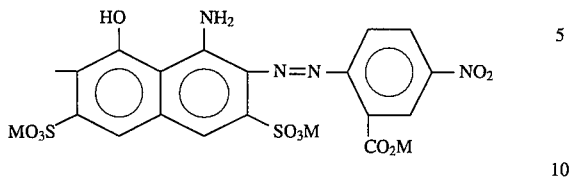
The foregoing dye is yellow when $R_1$ is $C_{12}H_{25}$ and $R_2$ is
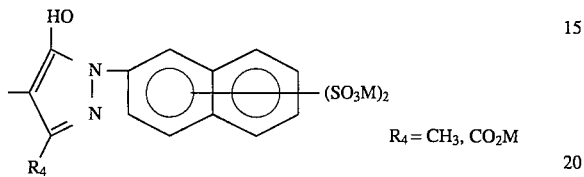
$R_4 = CH_3, CO_2M$
The foregoing dye is black when $R_1$ is $C_{12}H_{25}$ and $R_2$ is
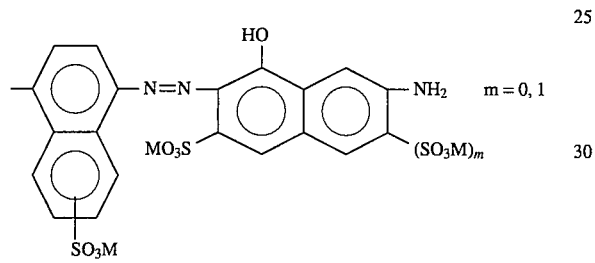
$m = 0, 1$
The foregoing dye is black when $R_1$ is $C_{12}H_{25}$ and $R_2$ is
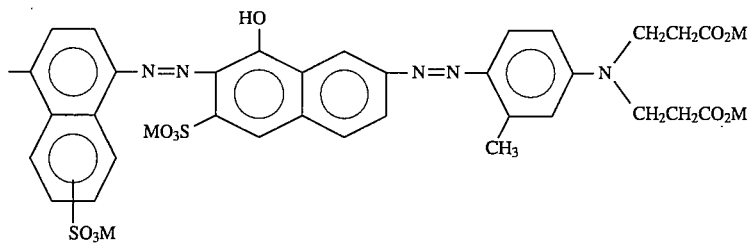
The foregoing dye is black when $R_1$ is $C_{12}H_{25}$ and $R_2$ is

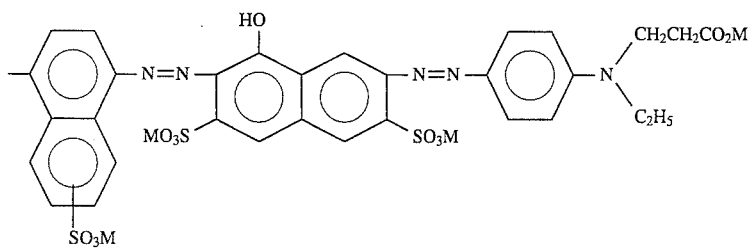

An effective ink comprises at least 1% by weight of said dye dissolved or dispersed in a polar vehicle such as water or a water and alcohol mixture.

These dyes are believed to form micellies in the vehicle by action of the carboxylic group but to be highly hydrophobic and therefore waterfast when printed by action of the R group.

BEST MODE FOR CARRYING OUT THE INVENTION

A representative and preferred aqueous ink has the following formula:

| Component | Percent by Weight |
|---|---|
| Dye A (below) | 2 |
| 2-pyrrolidinone (co-solvent) | 10 |
| Tergitol NP-10 (trademark) (nonionic surfactant) | 1–3 |
| Water, deionized | Remainder (87–85) |
| Dye A (Magenta) | |

This is prepared by mixing the dye, water, 2-pyrolidinone, and Tergitol surfactant and then ultrasonically agitating for 10 minutes. The ink is then filtered through a 0.22 micron filter.

Where the dodecyl group ($-C_{12}H_{25}$) is replaced by lower alkyl groups such as ethyl or butyl, the resulting dye molecules are soluble without the carboxylic group and the Tergitol surfactant. Dyes having $R_1$ groups from hexyl to octyl are soluble with the surfactant, but not exceptionally waterfast. The foregoing dodecyl and carboxylic acid containing molecule is both soluble without the surfactant and highly waterfast (93%). This is summarized in the following table.

| Dye Functional Groups | | Water | Tergitol | Filter | Waterfast |
|---|---|---|---|---|---|
| R | X | Solubility | Surfactant % | Ability | % |
| ethyl | H | yes | 0 | yes | — |
| ethyl | H | yes | 1 | yes | 43 |
| butyl | H | yes | 0 | yes | — |
| butyl | H | yes | 1 | yes | 52 |
| hexyl | H | no | 0 | no | — |
| hexyl | H | yes | 1 | yes | 59 |
| Octyl | H | no | 0 | no | — |
| Octyl | H | yes | 1 | yes | 76 |
| Dodecyl | H | no | 0 | no | — |
| Dodecyl | H | yes | 2 | yes | 78 |
| Dodecyl | COOH | yes | 0 | yes | 93 |

Waterfastness is measured by controlled soaking in water of paper printed with the ink. The percent waterfastness is the percent of optical density retained after a five minute soak in deionized water, observed, for example, by an optical densitometer.

What is claimed is:

1. A dye of the structural formula:

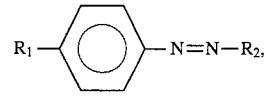

Wherein:

$R_1$ is an alkyl group having from 6 to 16 carbon atoms;

$R_2$ is one of the substituents in the following list of substitutents:

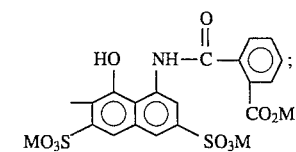

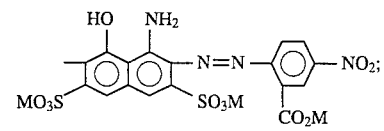

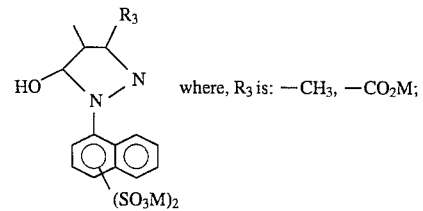

where, $R_3$ is: $-CH_3$, $-CO_2M$;

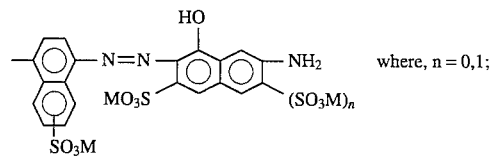

where, $n = 0, 1$;

-continued

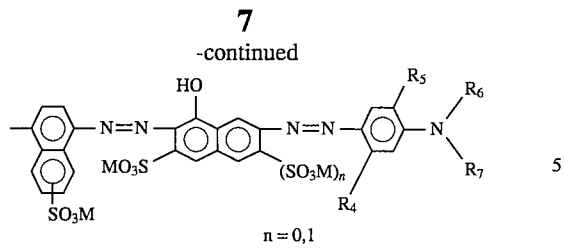

n = 0,1 where,
R₄ is: --H, --lower alkyl, --lower alkoxyl;
R₅ is: --H --lower alkyl, --lower alkoxyl;
R₆ is: --lower alkyl, --lower hydroxyalkyl, --CH₂CH₂CO₂M;
R₇ is: --lower hydroxylalkyl, --CH₂CH₂CO₂M; or

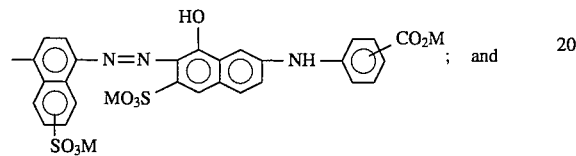; and

M is —H, —NH₄, —Li, —Na, —K.

2. A magenta dye as in claim 1 having the structure:

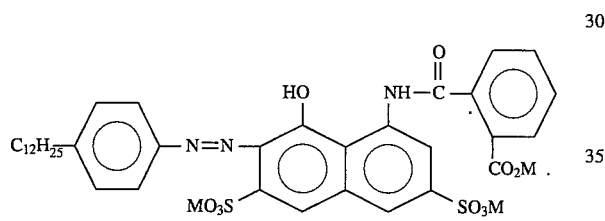

3. A black dye as in claim 1 having the structure:

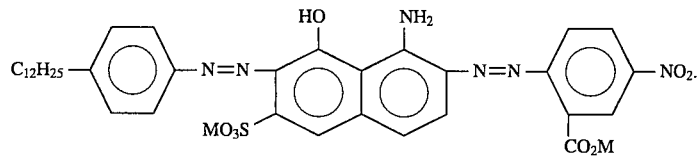

4. A yellow dye as in claim 1 having the structure:

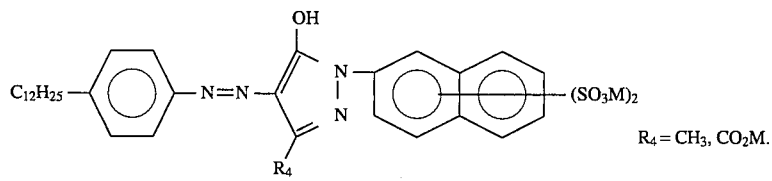

R₄ = CH₃, CO₂M.

5. A black dye as in claim 1 having the structure:

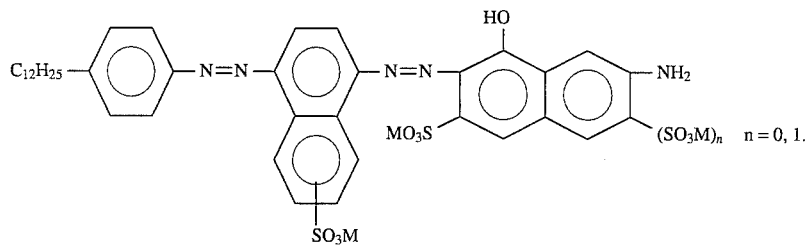
6. A black dye as in claim 1 having the structure:
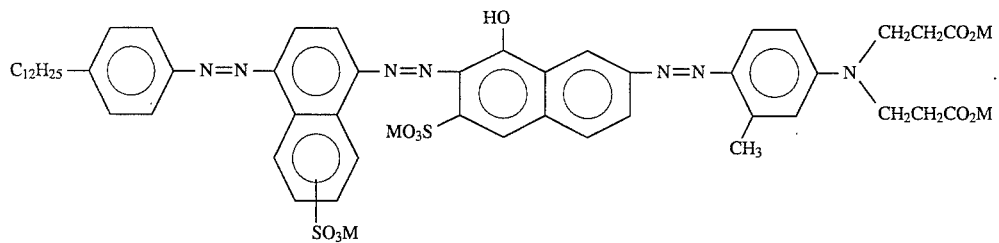
7. A black dye as in claim 1 having the structure:
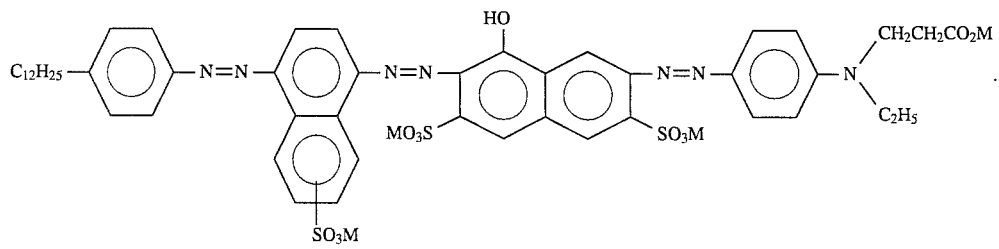
8. An ink comprising at least 1 percent by weight of dye dissolved in a polar vehicles, said dye being of the structural formula of claim 1.
9. The ink as in claim 8 in which said dye is a magenta dye of the structure:
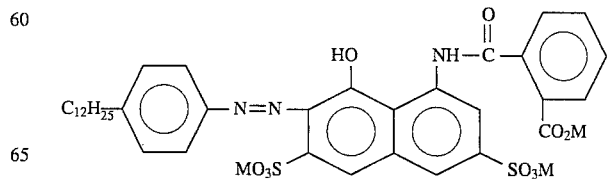

10. The ink as in claim 8 in which said dye is a black dye of the structure:
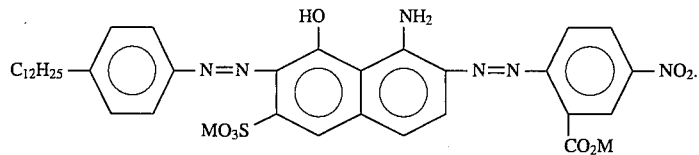
11. The ink as in claim 8 in which said dye is a yellow dye of the structure:
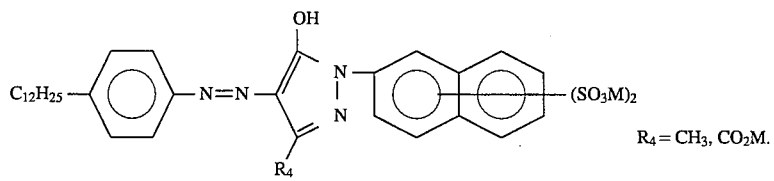
$R_4 = CH_3, CO_2M.$
12. The ink as in claim 8 in which said dye is a black dye of the structure:
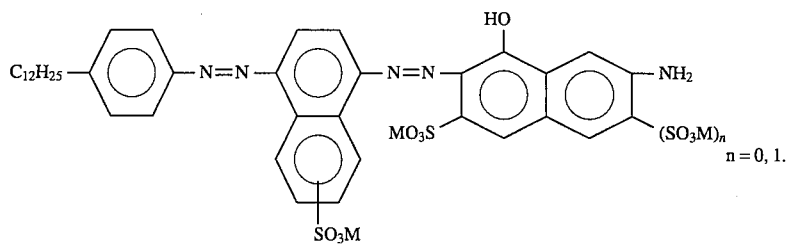
$n = 0, 1.$
13. The ink as in claim 8 in which said dye is a black dye of the structure:

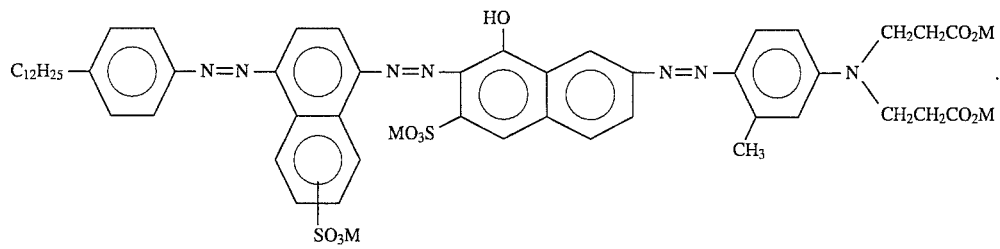

14. The ink as in claim 8 in which said dye is a black dye of the structure:

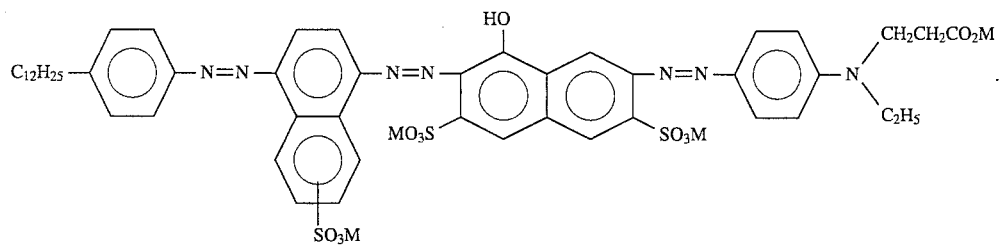

15. The ink of claim 14 also comprising 2-pyrrolidinone as a co-solvent.

16. The ink of claim 8 also comprising 2-pyrrolidinone as a co-solvent.

17. The ink of claim 9 also comprising 2-pyrrolidinone as a co-solvent.

18. The ink of claim 10 also comprising 2-pyrrolidinone as a co-solvent.

19. The ink of claim 11 also comprising 2-pyrrolidinone as a co-solvent.

20. The ink of claim 12 also comprising 2-pyrrolidinone as a co-solvent.

21. The ink of claim 13 also comprising 2-pyrrolidinone as a co-solvent.

* * * * *